March 25, 1941.    A. G. CRONINGER ET AL    2,236,133
COPYHOLDER
Filed Jan. 14, 1939    3 Sheets-Sheet 1
Fig. 1.
Fig. 2.
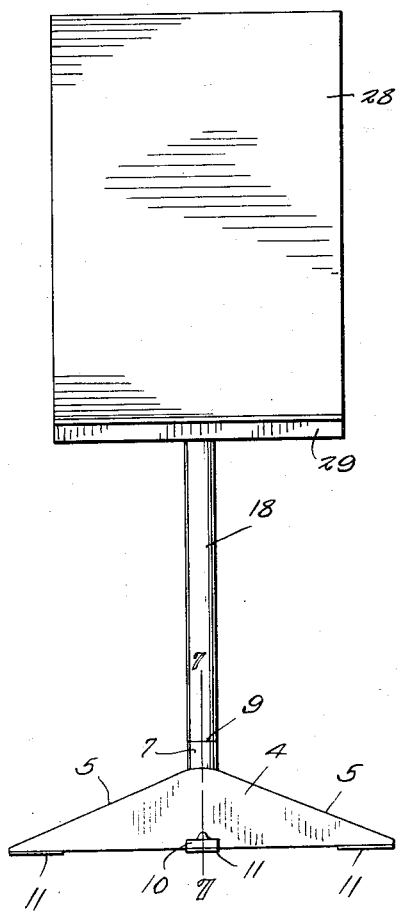
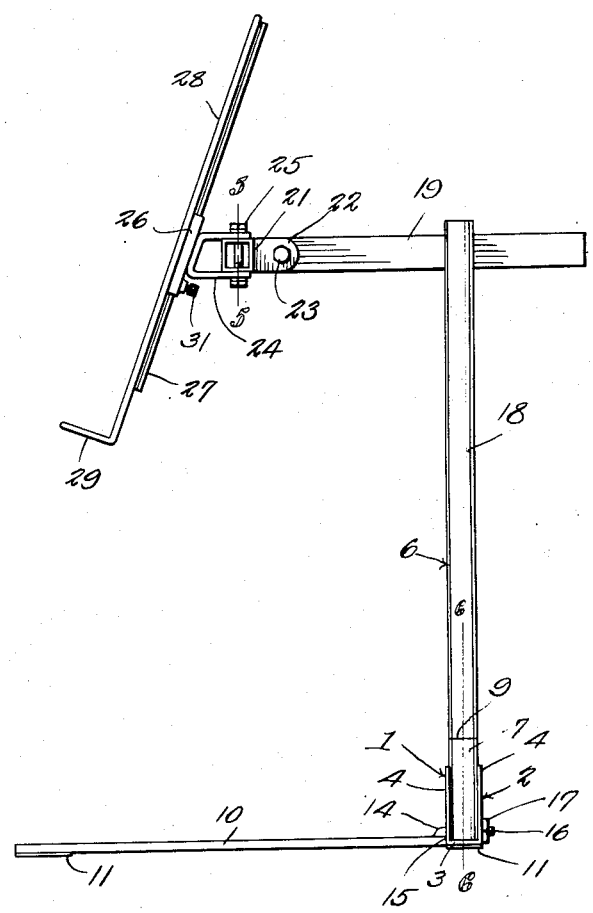
A. G. Croninger
O. D. Baker
INVENTOR.
BY
ATTORNEYS.

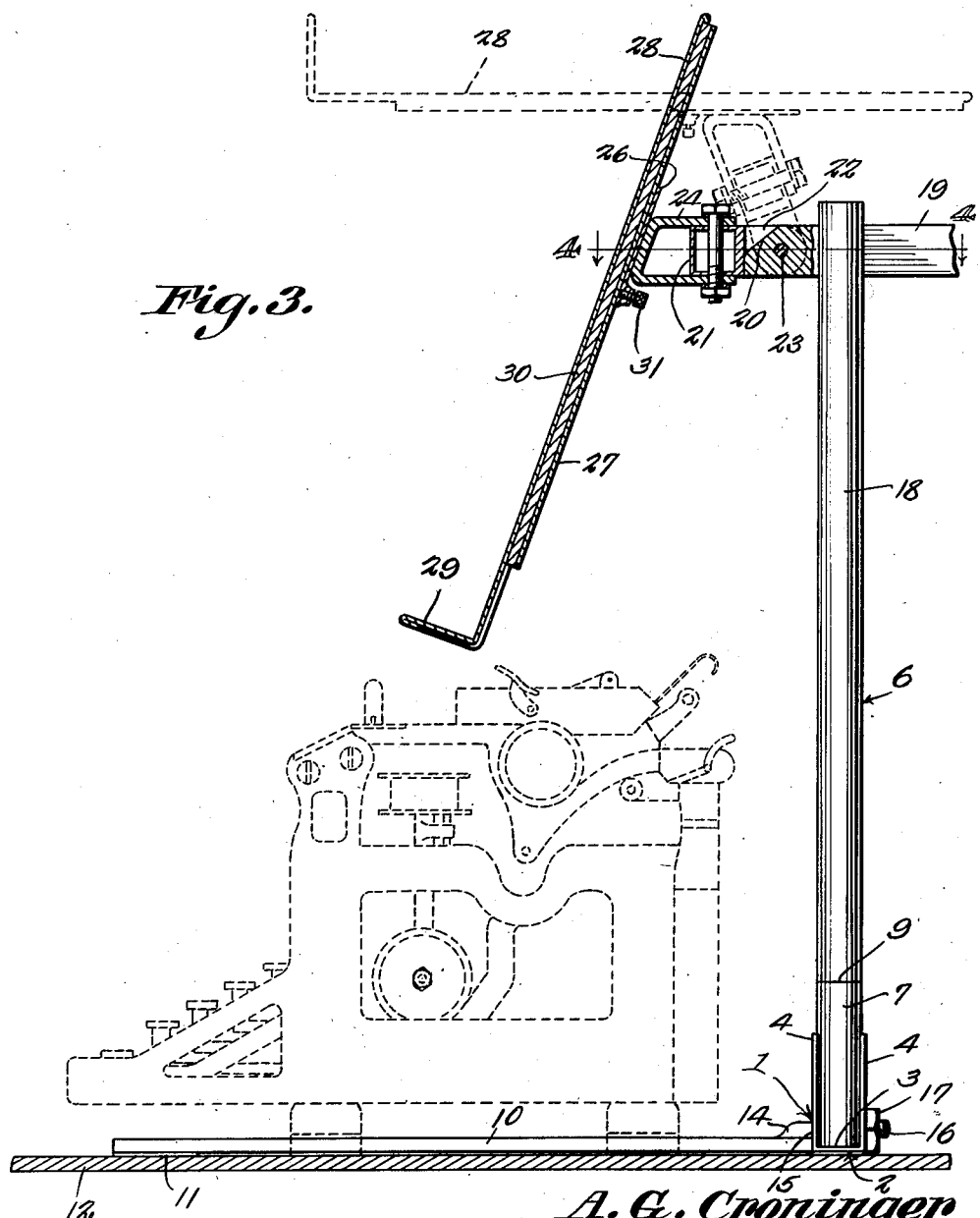

March 25, 1941.  A. G. CRONINGER ET AL  2,236,133
COPYHOLDER
Filed Jan. 14, 1939    3 Sheets-Sheet 3
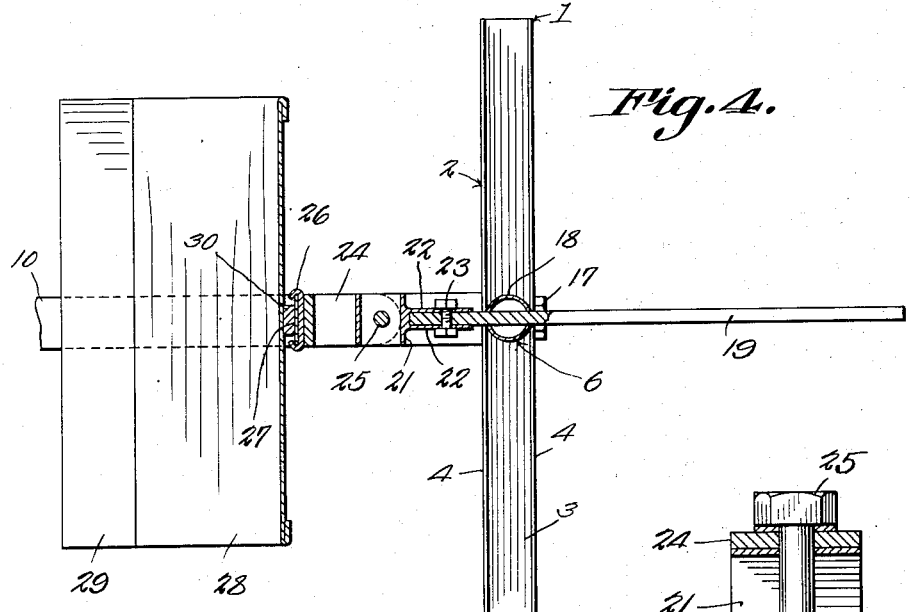
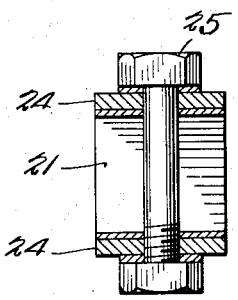
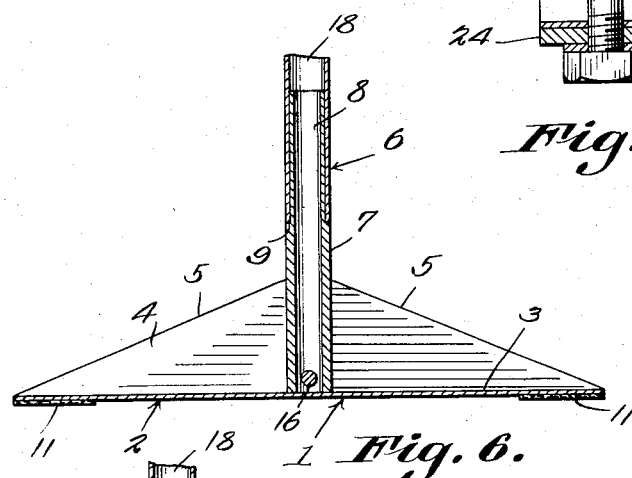
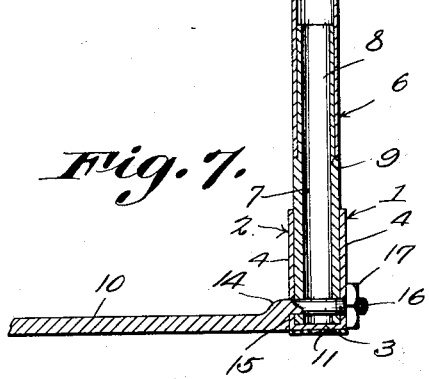
A. G. Croninger
O. D. Baker
INVENTOR.
BY C. A. Snow & Co.
ATTORNEYS.

Patented Mar. 25, 1941

2,236,133

UNITED STATES PATENT OFFICE 2,236,133

COPYHOLDER

Arthur G. Croninger and Olaf D. Baker, Miami, Okla.; said Baker assignor to Frank G. Dickinson, Champaign, Ill.

Application January 14, 1939, Serial No. 251,022

3 Claims. (Cl. 120—28)

This invention aims to provide a copyholder, the base of which will require but little material, and still have great stability. Another object of the invention is so to construct the base that a part of it may be slid under a typewriter, between the legs of the typewriter, the work holding table being brought into a convenient position, above the typewriter, and with respect to the copyist. Another object of the invention is to provide a copyholder the base of which may be left in place, to extend under a typewriter, a portion of the table-carrying standard being removed. Another object of the invention is to supply novel means whereby the table can be tilted backwardly to a horizontal, inoperative position, it being possible to adjust the table around a vertical axis and to adjust the table, by a sliding movement, as to height.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, wtihout departing from the spirit of the invention.

In the accompanying drawings:

Fig. 1 shows in front elevation, a copyholder constructed in accordance with the invention;

Fig. 2 is a side elevation;

Fig. 3 is a vertical section wherein many parts appear in elevation;

Fig. 4 is a horizontal section taken approximately on the line 4—4 of Fig. 3;

Fig. 5 is a vertical transverse section on the line 5—5 of Fig. 2;

Fig. 6 is a vertical section through the base and attendant parts;

Fig. 7 is a vertical section at right angles to the cutting plane in Fig. 6.

The copyholder forming the subject matter of this application preferably is made of metal throughout, saving as otherwise specified. It includes a base 1, which is T-shaped in top plan. The base 1 comprises a head 2, which is channel-shaped in cross section. The head 2 includes a bottom plate 3, and upwardly extended, parallel flanges 4. The upper edges of the flanges 4 slant downwardly, from the intermediate portion of the head 2, to the ends of the head, as shown at 5.

A tubular vertical standard 6 is supplied. The standard 6 includes a bottom member 7. The bottom member 7 fits closely between the flanges 4 of the head 2 and rests on the bottom plate 3 of the head. The bottom member 7 of the standard 6 has a reduced upper end 8, defining an external circumferential shoulder 9.

The T-shaped base 1 embodies an arm 10 arranged at right angles to the head 2. The arm 10 on the head 2 may be provided with any desired number of pads 11, to avoid scratching of the desk or table 12 whereon the device is mounted. At its rear end, the arm 10 is provided with a raised lug 14. The lug 14 forms a vertical shoulder 15 at the rear end of the arm 10. The shoulder 15 abuts against one of the flanges 4 of the head 2. The lug 14 is supplied with a reduced spindle 16. The spindle 16 extends through the flanges 4 of the head 2 and through the bottom member 7 of the standard 6, the standard thus being connected to the head 2. A nut 17 is threaded on the spindle 16, and, when the nut 17 is tightened up, the head 2 is bound to the arm 10, between the nut and the shoulder 15. By taking off the nut 17, the head 2 can be detached from the arm 10, for convenience in shipping. The arm 10 is connected to the head 2, at a point midway between the ends of the head, and, owing to the resulting T-shape of the head, stability is afforded, with a minimum amount of material.

Figure 3 shows that the head 2 is narrow. Therefore, when it is placed behind a typewriter, but little space will be taken up, behind the typewriter. The arm 10 is of such cross section that it may be slid forwardly on the table or desk 12, underneath the typewriter. Owing to this construction, the table, hereinafter described, can be located directly above the typewriter, the book, manuscript or other article on the table being disposed close to the copyist, and in a position in which the copy can be read without difficulty, during the typing operation.

The standard 6 comprises a tubular upper member 18. The tubular member 18 receives closely, the reduced upper end 8 of the bottom member 7 of the standard 6, and is supported by the shoulder 9. The upper member 18 of the standard 6 can be lifted off the part 8 of the bottom member of the standard 7 to facilitate packing or storing. The upper member 18 of the standard 6 is rotatable on the part 8 of the bottom member 7, and, consequently, the work on the table, which is being copied, can be disposed conveniently with respect to the operator, and with respect to a source of illumination.

A horizontal support 19, in the form of a rail, is slidably mounted for longitudinal adjustment in the upper portion of the member 18 of the standard 6. The support or rail 19 is so received in the upper member 18 of the standard 6 that the support or rail cannot rotate about a horizontal axis. The rail 19 is supplied at its forward end with a downwardly and forwardly inclined shoulder 20, shown in Fig. 3.

A box-like bracket 21 is disposed at the forward end of the support or rail 19. The bracket 21 has rearwardly extended wings 22. The forward end of the support or rail 19 is received between the wings 22. A horizontal pivot element 23 passes through the wings 22 and through the forward portion of the support 19. The bracket 21 can be turned upwardly and backwardly, until the rear wall of the bracket engages the inclined shoulder 20. This enables the work supporting table to be disposed in a horizontal position, out of the way of the operator of the typewriter and spaced from the carriage of the typewriter, to the end that a new sheet of paper can be put into the typewriter readily, and to the end that other similar operations may be performed.

The numeral 24 marks a U-shaped connector, including upper and lower arms. The bracket 21 extends between the arms of the connector 24. A pivot member 25, such as a bolt, extends through the bracket 21 and the arms of the connector 24. The pivot member 25 is vertically arranged, and, therefore, the connector 24 and the table that is carried by it may be swung laterally, for the convenience of the operator.

In order to dispose the work carrying table at a convenient backward slant, as shown in Fig. 3, the forward or intermediate portion of the connector 24 has a corresponding slant. The forward or intermediate portion of the connector 24 carries a fixed guide 26. The guide 26 is flanged to receive, for vertical adjustment, an elongated track 27. The track 27 is secured to a rearwardly inclined table 28. The table 28 has a forwardly presented stop 29 at its lower end. The function of the stop or shelf 29 is obvious. An elongated spacer 30 is held in place between the guide 26 and the table 28, so that the track 27 can work freely in the guide 26, to secure an up and down adjustment of the table. In order to hold the table 28 in any position to which it may have been adjusted vertically, a holding device 31 is provided, and may be a set screw threaded into the guide 26 and engaging the track 27.

Owing to the T-shape of the base 1, material is saved. The base cannot well tip over sidewise, owing to the provision of the head 2. The base cannot tip over forwardly, owing to the provision of the arm 10. It cannot tip over backwardly, because the arm 10 is underneath the typewriter. The arm 10 gives adequate support, and at the same time enables the table 28 to be located close to the copyist and above the typewriter. Adjustment from front to back is supplied, since the support or rail 19 can move lengthwise in the upper member 18 of the standard 6. The pivot element 23 affords a means whereby the table 28 can be turned up into the horizontal position of Fig. 3. The engagement between the bracket 21 and the shoulder 20 of the rail 19 stops the table 28 in a horizontal position. The table 28 can be swung around a vertical axis, represented by the pivot element 25, for the convenience of an operator. A vertical adjustment can be attained by slacking away the set screw 31 and raising or lowering the table, the track 27 reciprocating in the guide 26.

Since the head 2 is of small width, but little room is taken up by it, behind the typewriter. The upper member 18 of the standard 6 can be lifted off the bottom member 7 of the standard, the bottom member 7 and the arm 10 remaining in place on the desk 12, as shown in Fig. 3.

With the device forming the subject matter of this application, there may be incorporated line finders, paper holders and similar instrumentalities, not herein shown or described, because it is known that such features cannot be claimed in the same application with a supporting structure, specifically considered.

Having thus described the invention, what is claimed is:

1. A copyholder including a T-shaped base comprising a head and an arm, the arm being narrow enough and thin enough so that it can be inserted between the legs of a typewriter, and between the body of a typewriter and a supporting desk, whilst the typewriter remains in situ on the desk, a standard attached to the head, at the place of juncture between the head and the arm, the standard comprising separable upper and lower parts, a copy table, and means for mounting the table on the upper part of the standard.

2. A copyholder comprising a T-shaped base including a head and an arm, a standard disposed above the base, at the juncture of the head and the arm, the arm having a vertically offset finger defining a shoulder, the finger engaging the head and the standard and effecting a separable connection between the arm, the head and the standard, and a tightening device on the arm and engaging the arm to bind the arm against the shoulder.

3. A copyholder comprising a base, a standard carried by the base, a substantially horizontal rail mounted on the standard, a bracket having rearwardly prolonged arms between which the rail extends, a substantially horizontal pivot element connecting the arms and the rail, a connector including arms between which the bracket extends, a substantially vertical pivot element mounted in the arms of the connector and in the bracket, a copy table disposed at an angle to the vertical, and means for mounting the table on the connector, a rail having a substantially vertical shoulder which engages the bracket to maintain the table at said angle, and a rearwardly inclined shoulder spaced from the bracket to permit the bracket and the table to be tilted rearwardly.

ARTHUR G. CRONINGER.
OLAF D. BAKER.